Nov. 3, 1936.  W. D. TEAGUE  2,059,827
CAMERA CONSTRUCTION
Filed Feb. 26, 1936  2 Sheets-Sheet 1
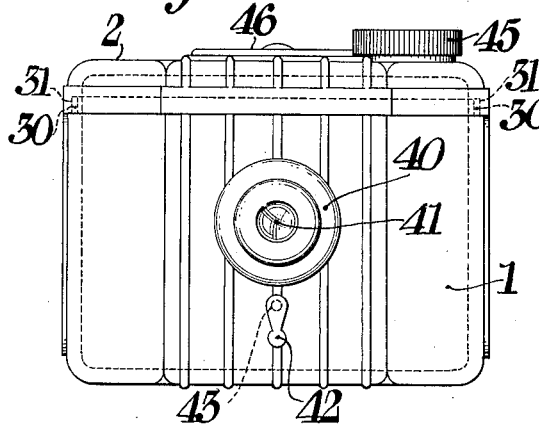
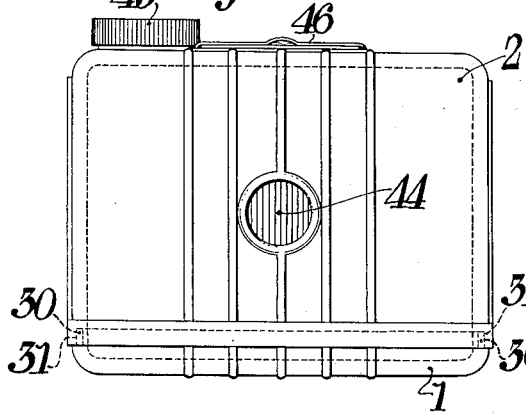
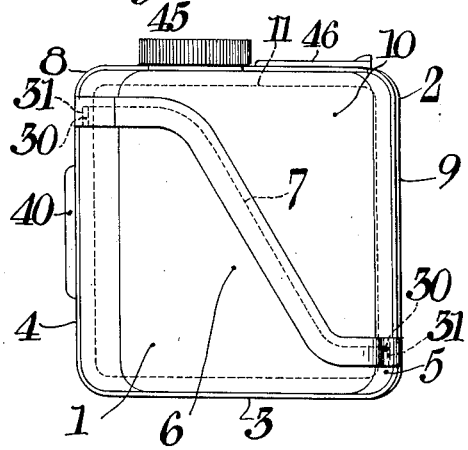
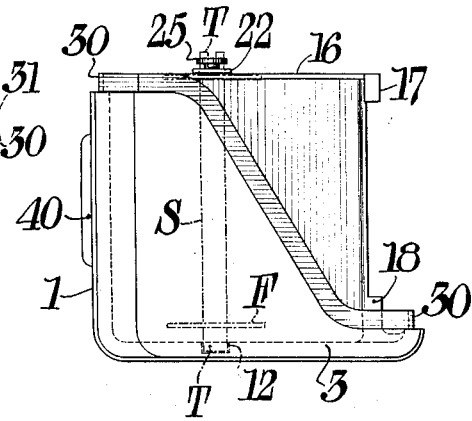

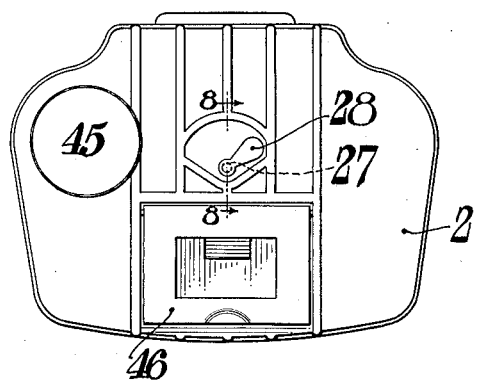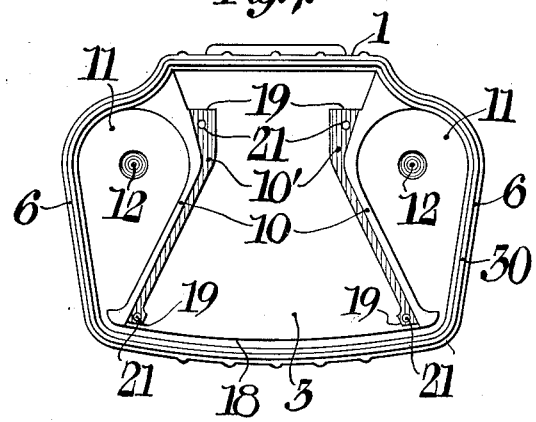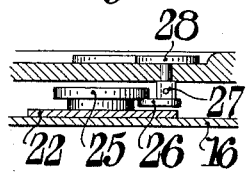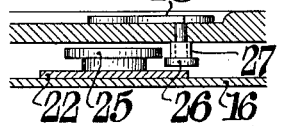

Patented Nov. 3, 1936

2,059,827

UNITED STATES PATENT OFFICE 2,059,827

CAMERA CONSTRUCTION

Walter D. Teague, New York, N. Y., assignor, by mesne assignments, to Eastman Kodak Company, Jersey City, N. J., a corporation of New Jersey Application February 26, 1936, Serial No. 65,862

14 Claims. (Cl. 95—31)

This invention relates to photography and more particularly to camera construction. One object of my invention is to provide a camera especially adapted to be made of a moldable composition in which the camera body and camera back are of complementary shape. Another object of my invention is to provide a camera the casing of which consists essentially of two parts which are of substantially the same size and shape. Another object of my invention is to provide a camera in which the camera body and back are separable upon a line drawn diagonally through the sides of the camera so that the camera body will include practically all of the front wall and so that the back will include practically all of the rear wall, the side walls being carried by both the camera front and camera back. Still another object of my invention is to provide a simple type of camera into which film can be readily loaded and unloaded. Other objects will appear from the following specification, the novel features being particularly pointed out in the claims at the end thereof.

Coming now to the drawings wherein like reference characters denote like parts throughout;

Fig. 1 is a front elevation of a camera constructed in accordance with and embodying a preferred form of my invention;

Fig. 2 is a rear plan view of the camera shown in Fig. 1;

Fig. 3 is a side elevation of the camera shown in Fig. 1;

Fig. 4 is a perspective view of a part of the roll holder used in the camera shown in the preceding figures;

Fig. 5 is a side elevation of the camera section with the camera back removed.

Fig. 6 is a top plan view of the camera shown in Fig. 1;

Fig. 7 is a view similar to Fig. 6 but with the camera back section removed;

Fig. 8 is a fragmentary detail in section showing the latch on line 8—8 of Fig. 6;

Fig. 9 is a view similar to Fig. 8 but with the latching elements in a different position.

My invention comprises broadly a camera which can be made in two parts, a camera body section and a camera back section which are of substantially the same general size and shape, one section being complementary in shape to the other.

As indicated in Fig. 1 the camera may be divided into the parts 1 and 2, part 1 constituting the camera body and part 2 constituting the camera back, although this term is used broadly to include that part of the camera which must be removed for the loading or unloading of film.

As indicated particularly in Fig. 3 the camera body 1 may consist of a bottom wall 3 which supports a front wall 4 of considerable length, a rear wall 5 which is comparatively short and side walls 6 which have a diagonal wall 7 connecting the long front wall 4 and the short rear wall 5.

The camera back 2 consists of a short front wall 8, a long rear wall 9 and side walls 10, all depending from a top wall 11. The side walls 10 also extend diagonally between the short front wall 8 and the long front wall 9 so that the shape of the camera parts 1 and 2 are substantially complementary and of approximately the same size.

The camera body section 1 is made of the shape above described because it forms a part which can be readily made of moldable material and because it forms a camera body section which can be readily loaded and unloaded with film when the roll holder is formed in the following manner. Referring to Fig. 7 the roll holder may be formed of upwardly extending walls 10 which may be conveniently made integral with the bottom 3 of the camera, these walls being so shaped that spool chambers 11 are formed between these walls and portions of the side walls 6. The upper sections of the side walls are formed by the side walls 10 of part 2 of the camera. The spool chambers 11 are semi-cylindrical in shape and are each provided with recesses or apertures 12 which extend into the bottom wall 3 but which do not pass through this wall as is indicated in Fig. 5. These recesses are to receive the trunnions T of the film spool S which has the usual flanges F.

In order to hold the upper trunnions T of the spool S the structure shown in Fig. 4 is employed. This consists of a plate 13 which may be formed of metal and which consists of a front section 14 in which there is an exposure window 15 and a top section 16 adapted to form the top of the roll holder and to form by means of the curved flange 17, the upper edge of an exposure frame which also includes a curved wall 18 formed as a part of the camera section 1 and two end members 19 formed as a part of the partitions 10. If desired, the partitions 10 may be grooved as indicated at 10' to receive the flat plate 16, the edges of which may fit snugly in the grooves.

The plate 13 may be attached to the camera part 1 by sliding the front plate 14 down past the shoulders 19 of the walls 10 so that the top wall 16 will lie on the top edges of the walls 10. Screws may attach the plate 13 by passing through the apertures 20 of the plate 16 down into the threaded apertures 21 formed in the walls 10.

In order to hold the top film spool trunnions, a spring arm 22 is attached to the top wall 16 in any suitable manner, as by spot welding, this spring arm extending out over each spool chamber 11 and being provided with apertures 23 to receive the upper spool trunnions T. These apertures are in alignment with apertures 12 in camera part 1.

The plate 16 also carries a latching element 25, best shown in Figs. 8 and 9, this latching element being in the form of a headed stud and being adapted to be engaged by a latch element 26 carried by the camera back section 2. Member 26 is pinned to a shaft 27 which may be turned by a handle member 28 so as to move the latch element 26 either into engagement with the headed stud, as indicated in Fig. 8, or away from engagement with this stud, as indicated in Fig. 9. Thus by pressing a lever 28 the latch elements can be engaged when the camera back portion 2 is operatively connected with the camera body portion 1.

It is necessary to form a light-tight joint between the camera body and the camera back. As indicated in Figs. 6 and 7 the camera body may be considered substantially rectangular in shape and there extends completely around the front, back and side walls of the camera, a groove and slot connection between the two camera parts. In the form of my invention shown in the drawings camera part 1 can be conveniently provided with an upstanding flange 30 which is adapted to engage in a corresponding groove 31 in camera back section 2, as illustrated in Fig. 2. It should be noted that the camera back and camera body separate on a line drawn substantially diagonally through the rectangular camera body. The shape of the inter-engaging flange 30 and groove 31 is such that the two camera parts are of substantially the same size and are complementary in shape.

The camera front section 1 may be provided with a forming 40 preferably annular in shape for holding a lens 41 and a shutter trigger 42 may be carried on a shaft 43 passing through the front to operate any standard type of shutter which has not been illustrated because it forms no part of the present invention.

The camera section 2 may be provided with the usual red or green window 44 through which the numeral on the film backing paper may be observed in winding film by turning the knob 45 mounted on the top of section 2. The top of this section may also carry a collapsible folding finder 46 of a standard type.

The advantages of constructing a camera of two substantially equal parts divided along a plane passing diagonally through the side walls are numerous. In the first place each part of a camera so constructed readily lends itself to being made of a moldable composition and forms a part of substantial size with suitable flanges formed by the front, rear and side walls for strengthening each part. In addition, the camera body so formed can readily be provided with a roll holding structure which requires a minimum number of metal parts to make a safe, light-tight structure. Moreover, in a camera so constructed, since practically an entire exposure frame is exposed by removing the back section, it is a simple matter to load film into place and to place the film spools in the semi-cylindrical film spool chambers. Where the two camera parts are of substantial size, it is a comparatively easy matter to provide a safe, light-tight joint between the two camera sections. Being made of moldable composition the parts can be readily decorated by suitable molded projections and by shaping the parts, as shown in the drawings, they appear to be much smaller than an entirely rectangular box, such as are generally made of sheet metal.

The operation of a camera constructed in accordance with my invention is extremely simple. To load the camera the locking arm 28 is swung to the opened position in which the locking lug 26 is moved from beneath the head of stud 25 so that section 2 may be removed from section 1 by moving it vertically with respect thereto, disengaging the flanges 30 which extend completely around the camera body from their corresponding grooves 31. Film spools S may then be mounted in the semi-cylindrical spool chambers 11 by inserting one trunnion T in the recess 12 and the opposite trunnion T in the aperture 23 of the spring arm 22. The backing paper may then be drawn out and attached to a second spool which is placed in the opposite spool chamber in the same manner. The camera back section 2 may then be replaced on the body and locked by lever 28 and the film may be wound to the first exposure by the winding knob 45 in the usual manner. The exposures may be made by the lever 42.

What I claim as new and desire to secure by Letters Patent of the United States is:

1. A camera comprising two cooperating parts, one constituting a camera body, the other constituting a camera back, the parts being of similar shape, each comprising a box-like receptacle having side walls with diagonally positioned edges and end walls connecting the ends of the diagonally arranged side walls whereby one wall is much shorter than the other and the side walls vary in height from the short wall toward the high wall.

2. A camera comprising two cooperating parts, one constituting a camera body, the other constituting a camera back, the parts being of similar shape, each comprising a box-like receptacle having side walls with diagonally positioned edges and end walls connecting the ends of the diagonally arranged side walls whereby one wall is much shorter than the other and the side walls vary in height from the short wall toward the high wall and a tongue and groove connection on the two cooperating parts making a light tight connection therebetween.

3. A camera comprising two cooperating parts, one constituting a camera body, the other constituting a camera shape, each comprising a box-like receptacle having side walls with diagonally positioned edges and end walls connecting the ends of the diagonally arranged side walls whereby one wall is much shorter than the other and the side walls vary in height from the short wall toward the high wall, an interengaging tongue and groove connection formed on the two cooperating edges of the two camera parts extruding entirely around the diagonally disposed side edges and the end edges connecting the diagonally disposed edges.

4. In combination, a camera comprising two separable parts, one constituting a camera body, the other constituting a camera back, said parts including cooperating flange connections extending straight across the back and front and extending diagonally across the sides, the camera body including a lens, an exposure frame, and spool chambers to each side of the lens, the exposure frame being exposed for loading the camera with film when the back is removed.

5. In combination, a camera comprising two separable parts, one constituting a camera body, the other constituting a camera back, said parts including cooperating flange connections extending straight across the back and front and extending diagonally across the sides, the camera body including a lens, an exposure frame, and spool chambers to each side of the lens, the exposure frame being exposed for loading the camera with film when the back is removed, the camera part constituting the back being provided with means for holding film spools in the spool chambers when the back is positioned on the camera body.

6. In combination, a camera comprising two separable parts, one constituting a camera body the other constituting a camera back, said parts including cooperating flange connections extending straight across the back and front and extending diagonally across the sides, the camera body including a lens, an exposure frame, and spool chambers to each side of the lens, the exposure frame being exposed for loading the camera with film when the back is removed, the camera part constituting the back being provided with means for holding film spools in the spool chambers when the back is positioned on the camera body, a latch carried by the camera back adapted to engage the camera body, and a finder carried by the camera back.

7. In combination, a camera comprising two separable parts, one constituting a camera body, the other constituting a camera back, the camera body including a relatively long front wall, a relatively short back wall, a pair of side walls having diagonally arranged edges connecting the front and back walls, and a flat bottom wall from which the other walls extend, the camera back being substantially complemental in shape.

8. In combination, a camera comprising two separable parts, one constituting a camera body, the other constituting a camera back, the camera body including a relatively long front wall, a relatively short back wall, a pair of side walls having diagonally arranged edges connecting the front and back walls, and a flat bottom wall from which the other walls extend, a roll holder carried by the bottom wall and forming with the higher portions of the diagonally arranged side walls chambers for receiving film rolls.

9. In combination, a camera comprising two separable parts, one constituting a camera body, the other constituting a camera back, the camera body including a relatively long front wall, a relatively short back wall, a pair of side walls having diagonally arranged edges connecting the front and back walls, and a flat bottom wall from which the other walls extend, a roll holder carried by the bottom wall and forming with the higher portions of the diagonally arranged side walls chambers for receiving film rolls, said chambers being substantially cylindrical in shape, the camera back being complemental in shape to the body and forming a closure for the ends of the spool chambers.

10. In combination, a camera comprising two separable parts, one constituting a camera body, the other constituting a camera back, the camera back including a top wall from which a short front wall, a long back wall, and side walls having diagonally disposed edges connecting the front and back walls depend, a latch element on the camera body and back, the element on the back being moveably mounted to latch the back on the camera body.

11. In combination, a camera comprising two separable parts, the camera being of substantially rectangular shape and including front, back, side, top and bottom walls, the camera body and back each including wedge shaped casing sections with cooperating light tight joints formed in the walls thereof, whereby the front and back may include a top or a bottom wall, and the joint between the top and bottom will be included in the front, back and side walls.

12. A camera comprising a substantially rectangular box-like structure and consisting of two parts, a camera body and a camera back, said rectangular box-like structure including top, bottom, side, front and back walls, a light tight connection between the body and back included solely in the front, back and side walls.

13. A camera comprising a substantially rectangular box-like structure and consisting of two parts, a camera body and a camera back, said rectangular box-like structure including top, bottom, side, front and back walls, a light tight connection between the body and back included solely in the front, back and side walls, said connection extending diagonally through at least two of said walls.

14. A camera comprising a substantially rectangular box-like structure and consisting of two parts, a camera body and a camera back, said rectangular box-like structure including top, bottom, side, front and back walls, a light tight connection between the body and back included solely in the front, back and side walls, said connection extending diagonally through at least two of said walls, the top and bottom comprising casing sections of approximately equal size, and a roll holder mounted in the body section.

WALTER D. TEAGUE.